US008565983B2

(12) United States Patent
Alberius et al.

(10) Patent No.: US 8,565,983 B2
(45) Date of Patent: Oct. 22, 2013

(54) METHOD AND SYSTEM FOR REGULATING THE LINEAR POSITION OF A FIFTH WHEEL

(75) Inventors: Gustav Alberius, Uppsala (SE); Morgan Colling, Hölö (SE); Sten-Erik Lestander, Mariefred (SE)

(73) Assignee: Scania CV AB (Publ) (SE)

( * ) Notice: Subject to any disclaimer, the term of this patent is extended or adjusted under 35 U.S.C. 154(b) by 98 days.

(21) Appl. No.: 13/131,955

(22) PCT Filed: Nov. 30, 2009

(86) PCT No.: PCT/SE2009/051351
§ 371 (c)(1),
(2), (4) Date: Jun. 30, 2011

(87) PCT Pub. No.: WO2010/064979
PCT Pub. Date: Jun. 10, 2010

(65) Prior Publication Data
US 2011/0257849 A1   Oct. 20, 2011

(30) Foreign Application Priority Data

Dec. 2, 2008  (SE) ...................................... 0802508

(51) Int. Cl.
*G06F 7/00* (2006.01)
(52) U.S. Cl.
USPC ............... 701/49; 701/53; 701/79; 280/438.1
(58) Field of Classification Search
USPC ............ 701/49, 36, 53, 79, 96; 180/11, 14.1; 280/438.1, 441, 446.1
See application file for complete search history.

(56) References Cited

U.S. PATENT DOCUMENTS

| 5,967,628 A * | 10/1999 | Abe et al. ................. 303/122.12 |
| 2008/0036173 A1 | 2/2008 | Alguera |
| 2011/0210529 A1* | 9/2011 | Markstaller ................. 280/438.1 |

FOREIGN PATENT DOCUMENTS

| CN | 101068796 A | 11/2007 |
| CN | 101296837 A | 10/2008 |

(Continued)

OTHER PUBLICATIONS

International Search Report dated Mar. 30, 2010, issued in corresponding international application No. PCT/SE2009/051351.

(Continued)

*Primary Examiner* — James Trammell
*Assistant Examiner* — Jerrah Edwards
(74) *Attorney, Agent, or Firm* — Ostrolenk Faber LLP

(57) ABSTRACT

A method and a system for regulating, while the vehicle is in motion, the linear position of a fifth wheel (4) of a vehicle combination which comprises a tractor unit (1) and a semi-trailer (2), which linear position of the fifth wheel is regulated automatically on the basis of the vehicle speed. Forward movement of the fifth wheel ordered in response to an increase in the vehicle speed, in order to reduce the distance between the driving cab (3) and the semi-trailer, is effected at a faster rate of movement of the fifth wheel at times when the tractor unit is performing a gear change operation than at times when the tractor unit is not performing a gear change operation. When a rearward movement of the fifth wheel to increase the distance between the driving cab and the semi-trailer has to be effected in response to a decrease in the vehicle speed, braking of the semi-trailer relative to the tractor unit is ordered, in order thereby to facilitate the rearward movement of the fifth wheel.

14 Claims, 4 Drawing Sheets

(56) References Cited

FOREIGN PATENT DOCUMENTS

| DE | 102007031318 A1 | 4/2008 |
|----|----|----|
| GB | 2425518 A | 11/2006 |
| WO | WO 2007/050019 A1 | 5/2007 |
| WO | WO 2007/068762 A1 | 6/2007 |
| WO | WO 2007/075165 A2 | 7/2007 |
| WO | WO 2008/142452 A1 | 11/2008 |

OTHER PUBLICATIONS

Chinese Search Report issued in corresponding Chinese Patent Application No. 200980148537.X.

* cited by examiner

METHOD AND SYSTEM FOR REGULATING THE LINEAR POSITION OF A FIFTH WHEEL

CROSS-REFERENCE TO RELATED APPLICATIONS

The present application is a 35 U.S.C. §§371 national phase conversion of PCT/SE2009/051351, filed Nov. 30, 2009, which claims priority of Swedish Application No. 0802508-2, filed Dec. 2, 2008, the contents of which are incorporated by reference herein. The PCT International Application was published in the English language.

FIELD OF THE INVENTION AND PRIOR ART

The present invention relates to a method and a system for regulating the linear position of a fifth wheel of a tractor unit while the vehicle is in motion. The invention relates also to a computer program product programmed with computer program code for implementing a method according to the invention, and to an electronic control unit.

A tractor unit for semi-trailers is usually provided with a coupling means conventionally known as a "fifth wheel". The fifth wheel is mounted on the chassis of the tractor unit at the rear portion of the tractor unit. The fifth wheel has a groove extending rearwards for accommodating a coupling device in the form of a so-called kingpin which protrudes downwards from the chassis of the semi-trailer at the forward end of the semi-trailer. The kingpin is locked firmly in the groove of the fifth wheel by a locking means.

A practice known from WO 2007/068762 A1, US 2008/0036173 A1 and DE 10 2007 031 318 A1 is automatic regulation of the linear position of a fifth wheel which is movable in such a way that it moves forward to reduce the distance between the tractor unit's driving cab and a semi-trailer in response to an increase in the vehicle speed and rearward to increase the distance between the driving cab and the semi-trailer in response to a decrease in the vehicle speed. Forward movement of the fifth wheel is effected in order to reduce the air resistance to the vehicle combination when it is travelling at high speeds. The clearance between the driving cab and the semi-trailer gives rise to air turbulence which affects the air resistance. The greater the clearance the stronger the air turbulence becomes, and the stronger the air turbulence the greater the air resistance becomes. Reducing the clearance therefore leads to reduced air resistance and hence reduced fuel consumption of the tractor unit. However, reducing the distance between the driving cab and the semi-trailer is disadvantageous with regard to the turning capability of the vehicle combination in that tight turns are not possible when this distance is small. If the distance between the driving cab and the semi-trailer is too small, the forward end of the semi-trailer will strike the rear side of the driving cab when the vehicle is executing a tight turn, with the possible consequence of major damage to the driving cab and the semi-trailer.

When the vehicle combination is travelling at high speeds, there may be other reasons for the vehicle combination not being able to execute turns which are too tight, and the distance between the driving cab and the semi-trailer may then be small. At lower speeds the vehicle combination may have to execute tight turns, in which case the distance between the driving cab and the semi-trailer needs to be greater to allow such tight turns to be executed.

OBJECT OF THE INVENTION

The object of the present invention is to propose a novel and advantageous way of effecting, while the vehicle is in motion, forward movement of a fifth wheel of a tractor unit to reduce the distance between the tractor unit's driving cab and a semi-trailer in response to an increase in the vehicle speed, and rearward movement to increase the distance between the driving cab and the semi-trailer in response to a decrease in the vehicle speed.

SUMMARY OF THE INVENTION

According to the present invention, the object is achieved by a method and a system for regulating, while the vehicle is in motion, the linear position of a fifth wheel (4) of a vehicle combination which comprises a tractor unit (1) and a semi-trailer (2), which linear position of the fifth wheel is regulated automatically on the basis of the vehicle speed. Forward movement of the fifth wheel ordered in response to an increase in the vehicle speed, in order to reduce the distance between the driving cab (3) and the semi-trailer, is effected at a faster rate of movement of the fifth wheel at times when the tractor unit is performing a gear change operation than at times when the tractor unit is not performing a gear change operation. Rearward movement of the fifth wheel to increase the distance between the driving cab and the semi-trailer has to be effected in response to a decrease in the vehicle speed, and braking of the semi-trailer relative to the tractor unit is ordered, in order thereby to facilitate the rearward movement of the fifth wheel.

According to the Invention forward movement of the fifth wheel which is ordered in response to an increase in the vehicle speed, in order to reduce the distance between the driving cab and the semi-trailer, is effected at a faster rate of movement of the fifth wheel at times when the tractor unit is performing a gear change operation than at times when the tractor unit is not performing a gear change operation, and/or braking of the semi-trailer relative to the tractor unit is ordered when a rearward movement of the fifth wheel to increase the distance between the driving cab and the semi-trailer has to be effected in response to a decrease in the vehicle speed, in order thereby to facilitate the rearward movement of the fifth wheel.

When the tractor unit accelerates, the force on the fifth wheel from the semi-trailer is directed rearwards, and in this situation a relatively strong force is therefore required to move the fifth wheel in the desired forward direction towards the driving cab. When the tractor unit changes gear, the acceleration of the tractor unit and hence also the rearward force exerted by the semi-trailer on the fifth wheel via its coupling means are reduced. Thus the switching device which controls the movement of the fifth wheel effects the desired forward movement at a faster rate of movement at a time when the tractor unit is performing a gear change operation than at a time when the tractor unit is not performing a gear change operation, without any need for the force by which the switching device acts upon the fifth wheel to be increased. Increasing the rate of movement of the fifth wheel at times when the tractor unit is performing a gear change operation makes it possible to achieve a desired linear position more quickly and hence achieve the linear position which results in reduced air turbulence and reduced fuel consumption.

When the tractor unit decelerates, the force on the fifth wheel from the semi-trailer is directed forwards, and in this situation a relatively large force is therefore required to move the fifth wheel in the desired rearward direction away from the driving cab. Somewhat braking the semi-trailer relative to the tractor unit in response to a decrease in the vehicle speed will reduce the forward force which the semi-trailer exerts on the fifth wheel, and the force from the semi-trailer on the fifth wheel may even become rearward. The desired rearward movement of the fifth wheel is thus facilitated by the braking of the semi-trailer relative to the tractor unit. The desired linear position may thus be achieved more quickly and with less exertion of force from the switching device, thereby enhancing traffic safety and at the same time reducing the dimensioning requirements for the switching device.

The invention relates also to a computer program product programmed to control the foregoing and an electronic control unit controlling the the operations described.

BRIEF DESCRIPTION OF THE DRAWINGS

The invention is described below in more detail on the basis of embodiments with reference to the attached drawings, in which.

DETAILED DESCRIPTION OF EMBODIMENTS OF THE INVENTION

Figure 1:
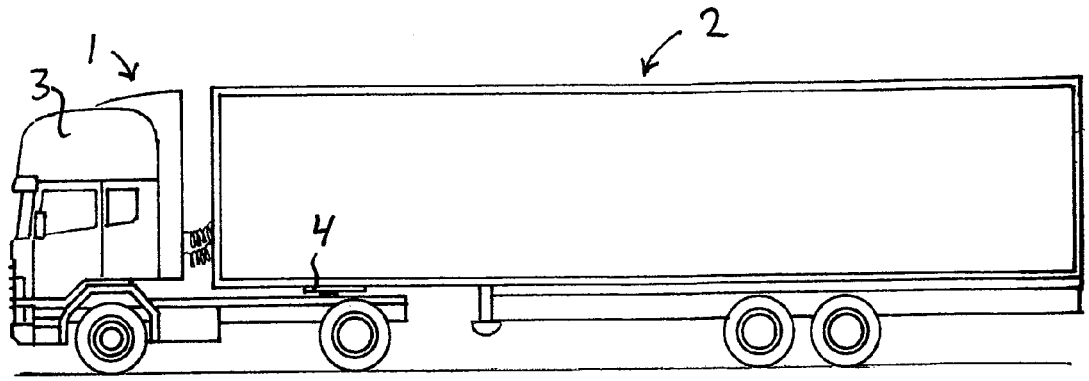
FIG. 1 depicts a side view of a vehicle combination comprising a tractor unit and a semi-trailer coupled to the latter.

FIG. 1 illustrates schematically a vehicle combination comprising a tractor unit 1 and a semi-trailer 2 coupled to the tractor unit. The tractor unit 1 is provided with a driving cab 3 and a coupling means in the form of a so-called fifth wheel 4. The fifth wheel 4 is fitted behind the driving cab 3 at the rear portion of the tractor unit 1. The fifth wheel 4 has a groove 5 extending rearwards for accommodating a coupling means 6 (see FIGS. 2-3), known as a kingpin, which protrudes downwards from the semi-trailer's chassis at the forward end of the semi-trailer 2. The coupling means 6 is locked firmly in the fifth wheel's groove 5 by a locking means. The locking means is of conventional configuration and is not depicted in the drawings. The semi-trailer 2 is thus coupled to the tractor unit 1 by engagement between the semi-trailer's coupling means 6 and the tractor unit's fifth wheel 4.

The fifth wheel 4 is movable relative to the driving cab 3 in the tractor unit's longitudinal direction and can be set in various linear positions relative to the driving cab 3 by means of a switching device 21 (see FIG. 4) which is part of a system 20 according to the present invention which is configured to make automatic regulation of the linear position of the fifth wheel possible while the vehicle is in motion. The fifth wheel 4 can move a given distance to and fro in the tractor unit's longitudinal direction to make it possible to regulate the distance between the fifth wheel 4 and the driving cab 3 and hence the distance d between the driving cab 3 and the semi-trailer 2.

Figures 2A, 2B:
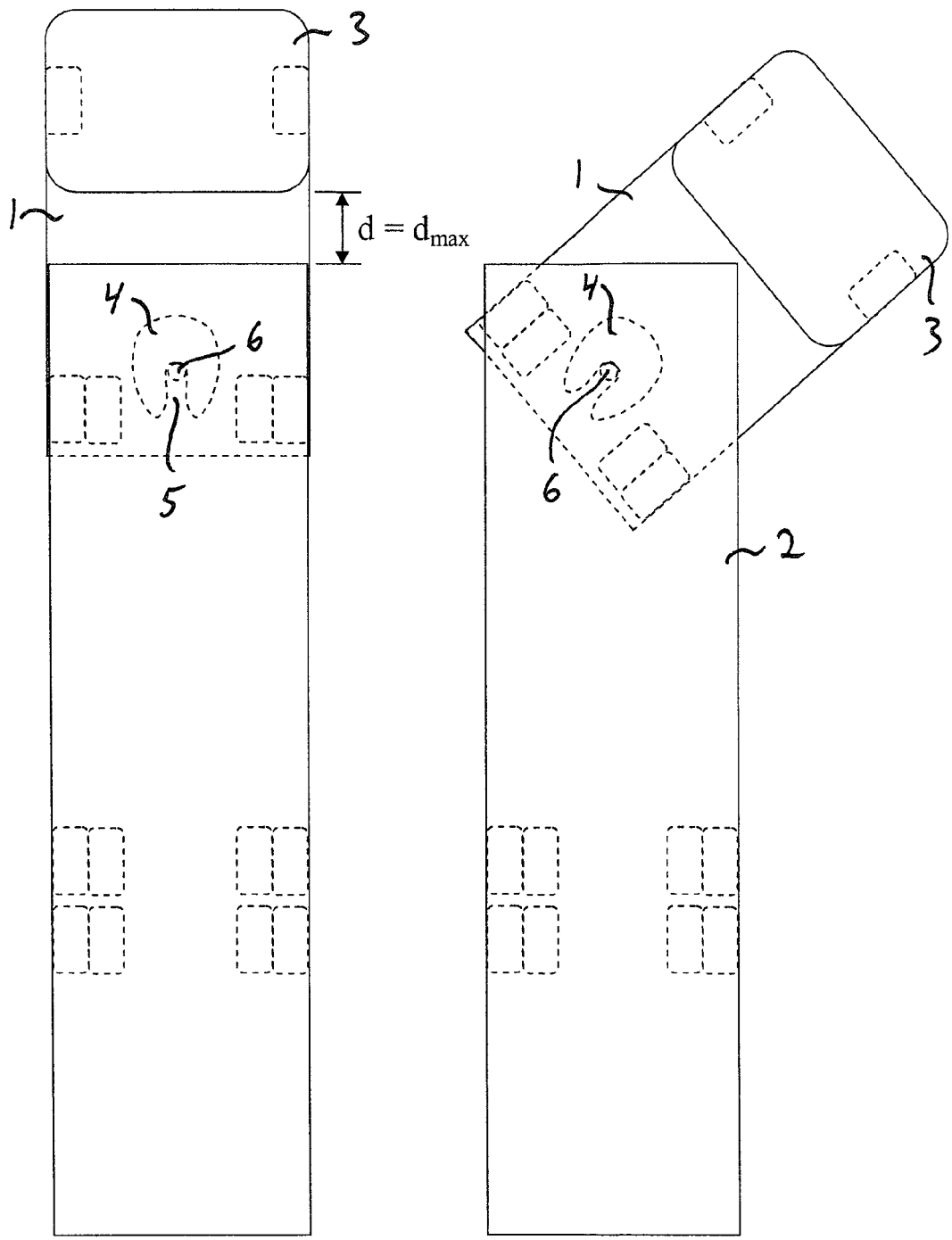
FIGS. 2a-b depict schematic plan views of the vehicle combination according to FIG. 1, with the tractor unit's fifth wheel in a first linear position.

FIGS. 2a and 2b illustrate schematically the vehicle combination with the fifth wheel 4 in its extreme rear position, i.e. with maximum spacing $d_{max}$ between the driving cab 3 and the semi-trailer 2. As depicted in FIG. 2b, the tractor unit 1 has in this case full turning capability relative to the semi-trailer 2 and can execute a tight turn without the driving cab 3 striking the semi-trailer.

Figures 3A, 3B:
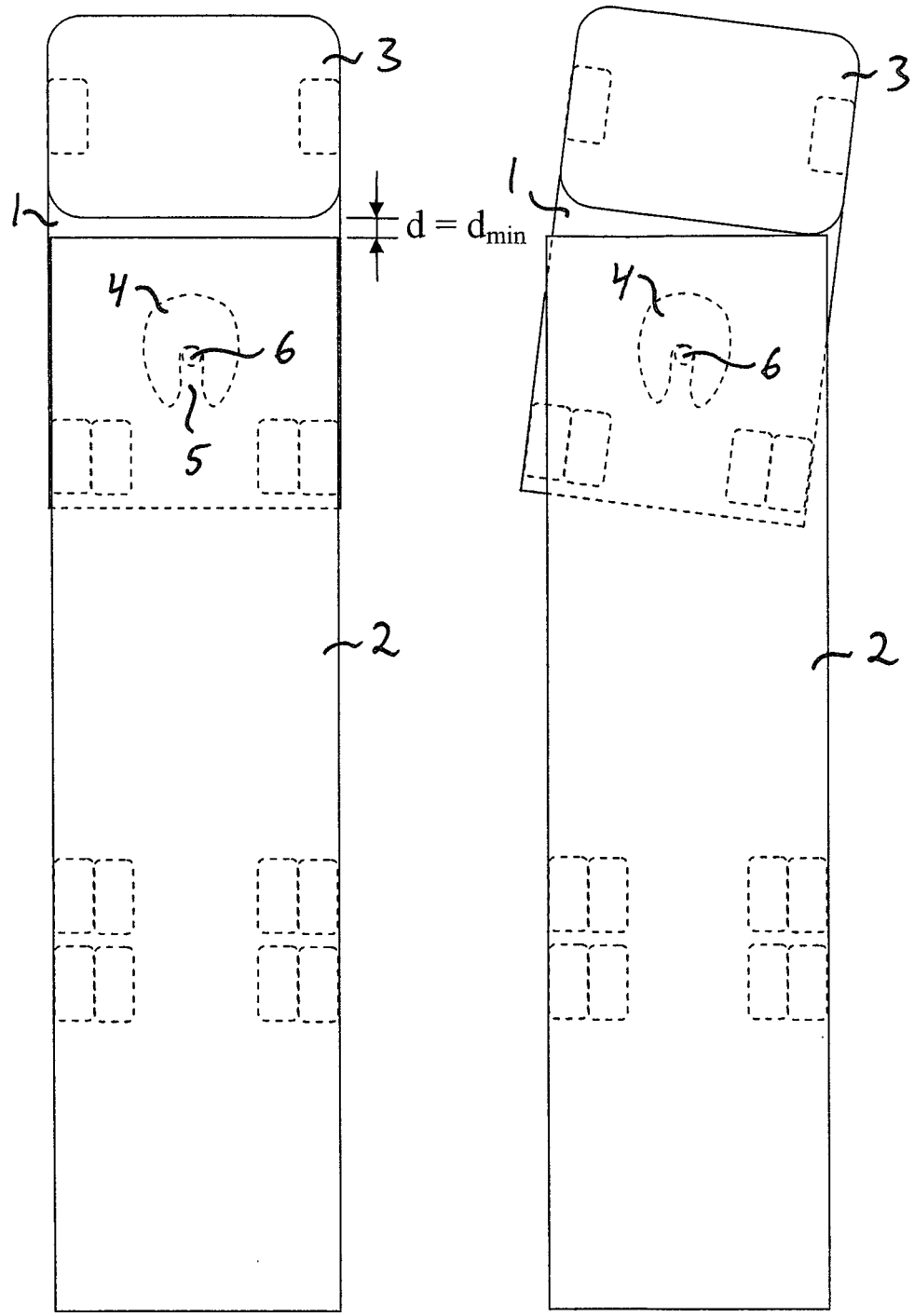
FIGS. 3a-b depict schematic plan views of the vehicle combination according to FIG. 1, with the tractor unit's fifth wheel in a second linear position.

FIGS. 3a and 3b illustrate schematically the vehicle combination with the fifth wheel 4 in its extreme forward position, i.e. with minimum spacing $d_{min}$ between the driving cab 3 and the semi-trailer 2. As depicted in FIG. 3b, the tractor unit 1 has in this case limited turning capability relative to the semi-trailer 2, and the driving cab 3 will strike the semi-trailer's forward end even when the tractor unit is executing a turn at a small angle relative to the semi-trailer.

Figure 4:
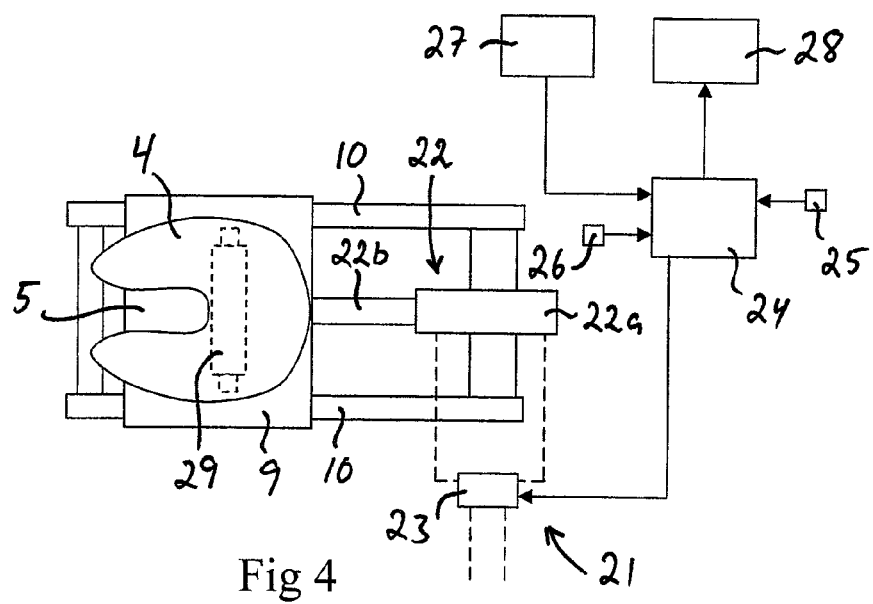
FIG. 4 depicts a skeleton diagram of a system according to an embodiment of the present invention.

In the example illustrated in FIG. 4, the fifth wheel 4 is mounted on a slide 9 which can slide along two slide rails 10. These slide rails 10 are firmly connected to the tractor unit's chassis and extend in the tractor unit's longitudinal direction. Movement of the slide 9 to and fro along the slide rails 10 will thus move the fifth wheel 4 to and fro in the tractor unit's longitudinal direction. The slide 9 is movable along the slide rails 10 by the aforesaid switching device 21 in whichever direction is desired. In the example illustrated, the switching device 21 comprises a double-acting hydraulic cylinder 22 and a valve device 23 for controlling the hydraulic flow to and from the hydraulic cylinder. The hydraulic cylinder 22 illustrated has a cylinder element 22a firmly connected to the tractor unit's chassis, and a piston which is accommodated in, and movable relative to, this cylinder element and which has a piston rod 22b fastened to the slide 9. FIG. 4 indicates schematically in the form of broken lines a locking device 29 which can be activated to lock the slide 9 and hence the fifth wheel 4 firmly in desired positions relative to the slide rails 10 at times when no change in the setting position of the fifth wheel is to be effected, in order thereby to relieve the load on the switching device 21 and ensure that no unintended movement of the fifth wheel takes place. When the fifth wheel 4 has to be moved in either direction in order to change its setting position, the locking device 29 is deactivated so that the slide 9 becomes free to move relative to the slide rails 10 in response to the action of the switching device 21.

As an alternative to what is described above, the fifth wheel's switching device 21 might be configured in some other known manner. The switching device might for example be adapted to moving the fifth wheel by means of a threaded rod and a nut which would be acted upon by a drive motor in the manner described in US 2008/0036173 A1, by means of a spring-loaded pneumatic bellows in the manner described in DE 10 2007 031 318 A1 or by means of one or more pneumatic cylinders.

The regulating system 20 comprises an electronic control device 24 for controlling the switching device 21 and the locking device 29. This control device 24 may take the form of a single electronic control unit for the tractor unit, as illustrated in FIG. 4, or two or more mutually interacting electronic control units. In the example illustrated in FIG. 4, the control device 24 is adapted to sending control signals to the valve device 23 to regulate the hydraulic flow to and from the hydraulic cylinder 22, in order thereby to regulate the linear position of the fifth wheel 4. The control device 24 is also adapted to sending control signals to the locking device 29 to control the latter's activation and deactivation.

The control device 24 is adapted to determining a set-point value $f_{bör}$ for the linear position of the fifth wheel 4 on the basis of the vehicle speed, and to controlling the switching device 21 on the basis of that set-point value $f_{bör}$ so that the fifth wheel is caused to assume a linear position along the slide rails 10 which corresponds to the respective set-point value. The control device 24 may be adapted to allowing said set-point value $f_{bör}$ to vary steplessly or step by step within a given range on the basis of the vehicle speed.

Information about the prevailing speed of the tractor unit 1 may be supplied to the control device 24 directly from a sensor 25 which is adapted to detecting the vehicle speed, or from an electronic control unit connected to such a sensor. The vehicle speed may for example be estimated on the basis of measured values from wheel speed sensors or on the basis of measured values for the rotation speed of some element of the tractor unit's driveshaft, e.g. the output shaft of the tractor unit's gearbox.

The control device 24 is further adapted to receiving or determining an actual value $f_{är}$ which represents the prevailing linear position of the fifth wheel 4. Information about the prevailing linear position of the fifth wheel 4 may be supplied to the control device 24 from a sensor 26 which is adapted to detecting the fifth wheel's linear position. By comparing the set-point value $f_{bör}$ with the actual value $f_{är}$, the control device 24 will determine whether forward movement of the fifth wheel 4 towards the driving cab 3 or rearward movement away from the driving cab needs to be effected by the switching device 21 in order to cause the actual value $f_{är}$ to correspond to the set-point value $f_{bör}$.

The control device 24 is adapted to controlling the switching device 21 in such a way on the basis of said set-point value $f_{bör}$ that forward movement of the fifth wheel 4 to reduce the distance between the driving cab 3 and the semi-trailer 2 in response to an increase in the vehicle speed is effected by the switching device 21 at a faster rate of movement of the fifth wheel at times when the tractor unit 1 is performing a gear change operation than at times when the tractor unit is not performing a gear change operation. For example, a predetermined first rate of movement v1 of the fifth wheel may be applied when no gear change operation is underway, and a predetermined second rate of movement v2 which is greater than the first rate of movement v1 may be applied when a gear change operation is underway. To make this control of the fifth wheel's rate of movement possible, the control device 24 is adapted to receiving from an electronic control unit 27 of the tractor unit, e.g. the tractor unit's gearbox control unit, information which indicates when a gear change operation of the tractor unit begins or ends. During the effecting, ordered by the control device 24, of a forward movement of the fifth wheel 4 towards the driving cab 3, the rate at which the switching device moves the fifth wheel may thus change between said first rate v1 and said second rate v2 if a gear change takes place during the time when the movement of the fifth wheel is taking place.

When in response to a decrease in the vehicle speed the control device 24 orders a rearward movement of the fifth wheel 4 in order to increase the distance between the driving cab 3 and the semi-trailer 2, the control device is adapted to simultaneously ordering braking of the semi-trailer 2 relative to the tractor unit 1, by delivering to an electronic brake control unit 28 a request for braking of the semi-trailer relative to the tractor unit, in order thereby to facilitate the rearward movement of the fifth wheel. The braking, ordered by the control device 24, of the semi-trailer 2 relative to the tractor unit 1 should of course not be too powerful but be kept to such a level that the driver is not disturbed by this braking.

Figure 6:
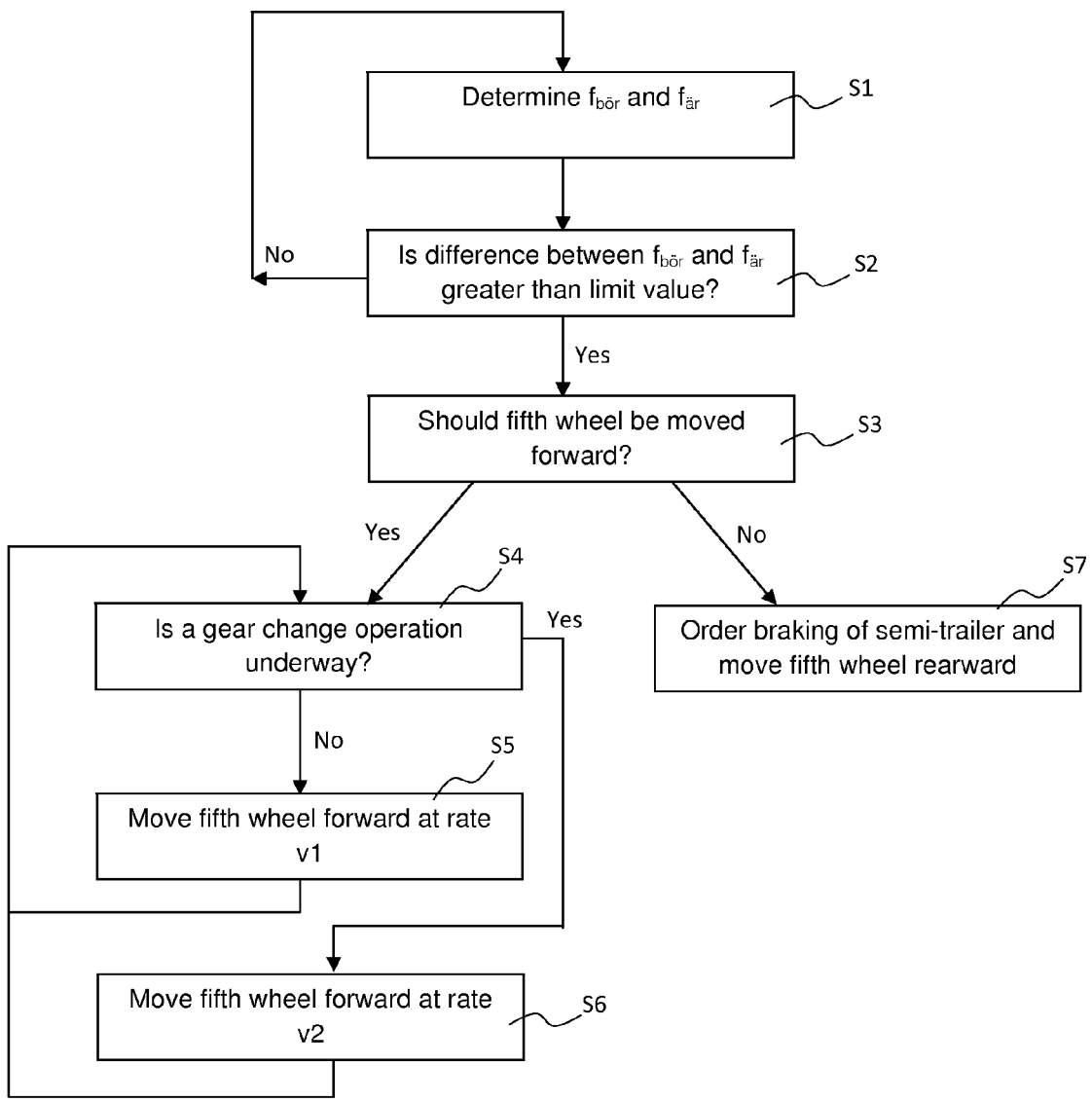
FIG. 6 depicts a flowchart illustrating a method according to an embodiment of the invention.

FIG. 6 depicts a flowchart illustrating an embodiment of a method according to the present invention for regulating, while the vehicle is in motion, the linear position of a fifth wheel 4 of the type described above arranged on a tractor unit.

At step S1 a set-point value $f_{bör}$ and an actual value $f_{är}$ for the fifth wheel's linear position are determined continuously while the tractor unit is in motion. At step S2 a comparison is made between the prevailing set-point value $f_{bör}$ and the actual value $f_{är}$. If the difference between the set-point value $f_{bör}$ and the actual value $f_{är}$ exceeds a given limit value, step S3 determines whether the fifth wheel 4 should be moved forward or rearward to cause the actual value $f_{är}$ to correspond to the set-point value $f_{bör}$. If step S3 finds that the fifth wheel 4 needs moving forward towards the tractor unit's driving cab 3, as is the case if the tractor unit 1 is accelerating, step S4 determines whether the tractor unit is or is not performing a gear change operation. If step S4 finds that no gear change operation is underway, step S5 orders the fifth wheel's switching device 21 to effect forward movement of the fifth wheel at a first rate of movement v1. If step S4 finds that a gear change operation is underway, step S6 orders the fifth wheel's switching device 21 to effect forward movement of the fifth wheel at a second rate of movement v2 which is greater than the first rate of movement v1. During the fifth wheel's forward movement, there is continuous monitoring of whether a gear change operation which is underway is ending or a new gear change operation is beginning, in which case a change of rate of movement between said rates of movement v1, v2 is effected depending on whether a gear change operation is beginning or ending. If step S3 finds that the fifth wheel 4 needs moving rearward away from the tractor unit's driving cab 3, as is the case if the tractor unit 1 is decelerating, step S7 will order braking of the semi-trailer 2 relative to the tractor unit 1 and will order the fifth wheel's switching device 21 to effect rearward movement of the fifth wheel.

Computer program code for implementing a method according to the invention is with advantage part of a computer program which can be read into an internal memory of a computer, e.g. the internal memory of an electronic control unit of a tractor unit. Such a computer program is with advantage provided via a computer program product comprising a data storage medium which is readable by an electronic control unit and which has the computer programme stored on it. Said data storage medium is for example an optical data storage medium in the form of a CD ROM disc, a DVD disc etc., a magnetic data storage medium in the form of a hard disc, a diskette, a cassette tape etc. or a flash memory or a memory of the ROM, PROM, EPROM or EEPROM type.

A computer program according to an embodiment of the invention comprises computer program code so configured, in a tractor unit which is provided with a fifth wheel which can by means of a switching device be set in various linear positions relative to a driving cab of the tractor unit, in the tractor unit's longitudinal direction, in order to regulate the distance between the driving cab and a semi-trailer coupled to the tractor unit via the fifth wheel, as to cause an electronic control unit of the tractor unit to:

receive or determine a value which represents the prevailing vehicle speed, determine a set-point value $f_{bör}$ for the linear position of the fifth wheel on the basis of the vehicle speed and control the switching device on the basis of that set-point value $f_{bör}$, and control the switching device in such a way that forward movement of the fifth wheel to reduce the distance between the driving cab and the semi-trailer in response to an increase in the vehicle speed is effected by the switching device at a faster rate of movement of the fifth wheel at times when the tractor unit is performing a gear change operation than at times when the tractor unit is not performing a gear change operation, and/or order braking of the semi-trailer relative to the tractor unit when the switching device has to effect a rearward movement of the fifth wheel in order to increase the distance between the driving cab and the semi-trailer in response to a decrease in the vehicle speed, in order thereby to facilitate the rearward movement of the fifth wheel.

Figure 5:
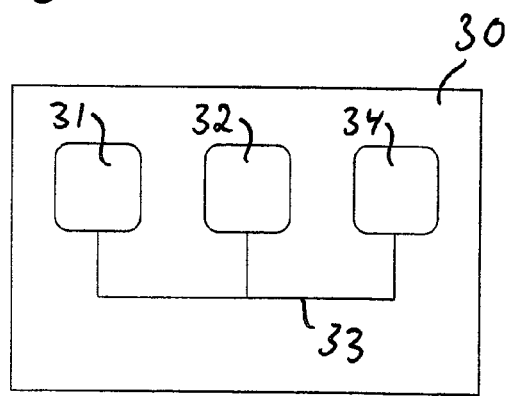
FIG. 5 depicts a skeleton diagram of an electronic control unit for implementing a method according to the invention.

FIG. 5 illustrates very schematically an electronic control unit 30 comprising an execution means 31, e.g. a central processor unit (CPU), for executing computer software. The executing means 31 communicates with a memory 32, e.g. of the RAM type, via a data bus 33. The unit 30 comprises also a data storage medium 34, e.g. in the form of a flash memory or a memory of the ROM, PROM, EPROM or EEPROM type. The execution means 31 communicates with the data storage means 34 via the data bus 33. A computer program comprising computer program code for implementing a method according to the invention, e.g. in accordance with the embodiment illustrated in FIG. 5, is stored on the data storage medium 34.

The invention is of course in no way limited to the embodiments described above, since a multitude of possibilities for modifications thereof are likely to be obvious to a specialist in the field without thereby having to deviate from the basic concept of the invention as defined in the attached claims.

The invention claimed is:

1. A method for regulating a linear position of a fifth wheel of a vehicle combination while the combination is in motion, wherein the vehicle combination comprises:
a tractor unit, a fifth wheel at the tractor unit and movable in the tractor unit's longitudinal direction, wherein the fifth wheel is configured to be set in various linear positions relative to the tractor unit by a switching device, and
a semi-trailer having a coupler, the semi-trailer is coupled to the tractor unit by engagement between the semi-trailer's coupler and the tractor unit's fifth wheel;
the method comprising:
regulating the linear position of the tractor unit's fifth wheel automatically on the basis of vehicle speed, the regulating comprising:
ordering forward movement of the fifth wheel with respect to the tractor unit in response to an increase in the vehicle speed, and thus reducing a distance between the tractor unit and the semi-trailer,
the forward movement performed at a faster rate of movement of the fifth wheel with respect to the tractor unit at times when the tractor unit is performing a gear change operation than at times when the tractor unit is not performing a gear change operation, and
ordering braking of the semi-trailer relative to the tractor unit to cause a rearward movement of the fifth wheel with respect to the tractor unit thus increasing the distance between the tractor unit and the semi-trailer in response to a decrease in the vehicle speed.

2. A method according to claim 1, further comprising regulating the linear position of the fifth wheel steplessly between two extreme positions on the basis of the vehicle speed.

3. A method according to claim 1, further comprising regulating the linear position of the fifth wheel step by step between two extreme positions on the basis of the vehicle speed.

4. A system for regulating a linear position of a fifth wheel of a tractor unit while the tractor unit is in motion, the fifth wheel coupling a semi-trailer to the tractor unit, the system comprising:

a switching device operatively connected to the fifth wheel and configured for setting the fifth wheel in various linear positions relative to the tractor unit in the tractor unit's longitudinal direction and thus regulating a distance between the tractor unit and the semi-trailer; and
an electronic control device configured and operable to control the switching device, and the control device is operable to determine a set-point value for the linear position of the fifth wheel on the basis of the vehicle speed, and is operable to control the switching device on the basis of the set-point value,
wherein the control device is configured and operable to control the switching device based on the set-point value of the control device to cause the switching device to cause forward movement of the fifth wheel to reduce distance between the tractor unit and the semi-trailer in response to an increase in vehicle speed and to cause a faster rate of movement of the fifth wheel at times when the tractor unit is performing a gear change operation than at times when the tractor unit is not performing a gear change operation, and
in response to a decrease in the vehicle speed, the control device causes the switching device to cause rearward movement of the fifth wheel thus increasing the distance between the tractor unit and the semi-trailer, and
the control device is configured and operable to simultaneously order braking of the semi-trailer relative to the tractor unit, in order thereby to facilitate the rearward movement of the fifth wheel.

5. A system according to claim 4, wherein the control device is configured and operable for allowing the set-point value to vary steplessly within a given range on the basis of the vehicle speed.

6. A system according to claim 4, wherein the control device is configured and operable for allowing the set-point value to vary step by step within a given range on the basis of the vehicle speed.

7. A system according to claim 4, further comprising an electronic control unit of the tractor unit;
the control device is configured and operable for receiving from the electronic control unit of the tractor unit information which indicates when a gear change operation of the tractor unit begins and ends for the control device to control the switching device.

8. A system according to claim 4, further comprising an electronic brake control unit for the semi trailer;
the control device is configured and operable for delivering to the electronic brake control unit a request for braking of the semi-trailer relative to the tractor unit when, in response to a decrease in the vehicle speed, the electronic brake control unit orders a rearward movement of the fifth wheel in order to increase the distance between the tractor unit and the semi-trailer.

9. A non-transitory computer readable program product comprising computer program code programmed on a programmable data storage medium, the non-transitory computer-readable program product located in a tractor unit which is provided with a fifth wheel and the fifth wheel, by means of a switching device, is configured to be set in various linear positions relative to the tractor unit, in the tractor unit's longitudinal direction, in order to regulate the distance between the tractor unit and a semi-trailer coupled to the tractor unit via the fifth wheel,
the program being configured and operable for causing an electronic control device of the tractor unit to:
receive or determine a value which represents a prevailing vehicle speed, determine a set-point value for the linear position of the fifth wheel on the basis of the vehicle speed and control the switching device on the basis of that set-point value and control the switching device to effect that forward movement of the fifth wheel to reduce the distance between the tractor unit and the semi-trailer in response to an increase in the vehicle speed, the forward movement effected by the switching device at a faster rate of movement of the fifth wheel at times when the tractor unit is performing a gear change operation than at times when the tractor unit is not performing a gear change operation, and order braking of the semi-trailer relative to the tractor unit, thus increasing when the switching device effects rearward movement of the fifth wheel the distance between the tractor unit and the semi-trailer in response to a decrease in the vehicle speed.

10. A computer program product according to claim 9, wherein the computer program product a data storage medium is readable by an electronic control unit, and the computer program comprises code stored on the data storage medium.

11. An electronic control unit for a tractor unit, comprising an execution device, a memory connected to the execution device, and a data storage medium connected to the execution device, and the computer program code of a computer program product according to claim 9 being stored on the data storage medium.

12. A method according to claim 1, wherein the tractor unit comprises a driving cab on the tractor unit, wherein the increase and the reduction of the distance is between the cab and the semi-trailer.

13. A system according to claim 4, wherein the tractor unit comprises a driving cab on the tractor unit, wherein the control device causes the increase and the reduction of the distance to be between the cab and the semi-trailer.

14. A computer program product according to claim 9, wherein there is a driving cab on the tractor unit, and the electronic control device is configured to cause the increase and the reduction of the distance between the cab and the semi-trailer.

* * * * *

UNITED STATES PATENT AND TRADEMARK OFFICE
CERTIFICATE OF CORRECTION

PATENT NO. : 8,565,983 B2  Page 1 of 1
APPLICATION NO. : 13/131955
DATED : October 22, 2013
INVENTOR(S) : Alberius et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 126 days.

Signed and Sealed this

Fifteenth Day of September, 2015

Michelle K. Lee
*Director of the United States Patent and Trademark Office*